US011741603B2

(12) United States Patent
Salles (10) Patent No.: US 11,741,603 B2
(45) Date of Patent: Aug. 29, 2023

(54) METHOD AND SYSTEM FOR THE MANAGEMENT OF AN AGRICULTURAL PLOT

(71) Applicant: AGRICONNECT, Manosque (FR)

(72) Inventor: Jose Salles, Lyons (FR)

(73) Assignee: AGRICONNECT

(*) Notice: Subject to any disclaimer, the term of this patent is extended or adjusted under 35 U.S.C. 154(b) by 0 days.

(21) Appl. No.: 17/540,285

(22) Filed: Dec. 2, 2021

(65) Prior Publication Data

US 2022/0092779 A1 Mar. 24, 2022

Related U.S. Application Data

(63) Continuation of application No. 16/816,707, filed on Mar. 12, 2020, now Pat. No. 11,216,946.

(51) Int. Cl.
| | |
|---|---|
| *G06K 9/00* | (2022.01) |
| *A01N 25/00* | (2006.01) |
| *G06T 7/00* | (2017.01) |
| *A01G 17/00* | (2006.01) |

(52) U.S. Cl.
CPC .......... *G06T 7/0012* (2013.01); *A01G 17/005* (2013.01); *G06T 2207/10024* (2013.01);
(Continued)

(58) Field of Classification Search
CPC ...... G06K 9/00; H04N 5/36961; A01N 25/26; A01N 25/00; G06T 7/00
(Continued)

(56) References Cited

U.S. PATENT DOCUMENTS

| | | | |
|---|---|---|---|
| 9,532,508 B1* | 1/2017 | Stubbs | H04N 7/183 |
| 11,044,404 B1* | 6/2021 | Persiantsev | G01B 11/245 |

(Continued)

FOREIGN PATENT DOCUMENTS

| | | |
|---|---|---|
| DE | 10 2012 010912 B3 | 8/2013 |
| EP | 2854506 B1 | 7/2016 |
| ES | 2253135 A1 | 5/2006 |

OTHER PUBLICATIONS

Kaur et al., "An Optimized Computer Vision Approach to Precise Well-Bloomed Flower Yielding Prediction using Image Segmentation", International Journal of Computer Applications (0975-8887), vol. 119, No. 23, Jun. 2015.
(Continued)

*Primary Examiner* — Seyed H Azarian
(74) *Attorney, Agent, or Firm* — BCF LLP (57) ABSTRACT

The present invention relates to a decision support method for the management of an orchard of fruit trees, the method comprising the following steps:
  Receiving (10) a plurality of digital images acquired in color,
  Then for each current image of the plurality of images:
    Converting (20) the current digital image acquired, into a converted HSL image coded in Hue Saturation and Lightness components,
    Filtering (30) the Hue Saturation and Lightness components,
    Combining (40) the filtered Hue Saturation and Lightness planes (5, 6, 7) to obtain a Combined plane (12),
    Calculating (50) a Work plane (13) from the Combined plane (12),
    Counting (60) the objects of interest in the Work plane (13),
  Determining (70) a blossoming level for each current image as a function of the number of objects of interest counted for said current image.

10 Claims, 6 Drawing Sheets

(52) U.S. Cl.
CPC ............... *G06T 2207/20216* (2013.01); *G06T 2207/20221* (2013.01); *G06T 2207/20224* (2013.01); *G06T 2207/30188* (2013.01); *G06T 2207/30242* (2013.01)

(58) Field of Classification Search
USPC ....... 382/100, 103, 106, 108, 110, 140, 162, 382/172, 173, 181, 194, 199, 224, 254, 382/276, 286, 298, 305, 165, 321; 504/100; 358/1.9
See application file for complete search history.

(56) References Cited

U.S. PATENT DOCUMENTS

| | | | |
|---|---|---|---|
| 2010/0060915 A1* | 3/2010 | Suzuki | G06V 10/56 358/1.9 |
| 2012/0195496 A1 | 8/2012 | Zaman et al. | |
| 2015/0015697 A1 | 1/2015 | Redden et al. | |
| 2017/0032509 A1 | 2/2017 | Mannar et al. | |
| 2017/0286772 A1* | 10/2017 | Workman | H04L 67/10 |
| 2019/0349539 A1* | 11/2019 | Motonaga | H04N 25/704 |
| 2020/0359550 A1* | 11/2020 | Tran | A01C 23/047 |

OTHER PUBLICATIONS

Lefevre et al., "Apport de l'espace Teinte-Saturation-Luminance pour la segmentation spatiale et temporelle", Traitement du Signal 2006, vol. 23, No. 1.

Najjar et al., "Flower Image Segmentation based on color analysis and a supervised evaluation", 2012 Internationa Conference on Communications and Information Technology (ICCIT), IEEE Xplore: Aug. 27, 2012.

* cited by examiner

METHOD AND SYSTEM FOR THE MANAGEMENT OF AN AGRICULTURAL PLOT

CROSS-REFERENCE TO RELATED APPLICATIONS

This application is a continuation of U.S. patent application Ser. No. 16/816,707 filed Mar. 12, 2020, the contents of which are hereby incorporated by reference in their entirety.

FIELD OF THE INVENTION

The present invention relates to the general technical field of precision farming.

More specifically, the present invention relates to a method and an associated system for the management of an agricultural plot in order to optimize its productivity for improving a production yield.

BACKGROUND OF THE INVENTION

In an orchard, the blossoming of the fruit trees is heterogeneous:
- some trees have too much flowers such that the produced fruits are too small compared to the market standards, and
- other trees do not have enough flowers such that the produced fruits are too large or too few.

This is the reason why farmers perform:
- the thinning of the fruit trees to remove the flowers from the trees with too much flowers, and
- the introduction of chemical fertilizers and/or inputs into the soil in order to promote the blossoming of the fruit trees (and/or limit the natural fall of the flowers) when they do not have enough flowers.

The thinning is a (manual, mechanical or chemical) method consisting in leaving the optimal number of flowers (then fruits) on the tree in order to obtain the best possible yield by balancing the quality, the size of the fruits and the volume of production.

The phases of thinning and supplying fertilizers are therefore important in the field of the production of fruits from fruit trees, and in particular apple trees, in order to ensure optimal fruit production in terms of quality, quantity and size.

At present, there is currently no solution to estimate the blossoming rate of each fruit tree in an orchard (which can include between 2,500-3,000 trees per hectare).

Due to the lack of a method for mapping intra-plot blossoming rates, the agricultural experts are currently giving an estimate of the average blossoming rate of an orchard by observing some trees. This estimate is generally lowered by the arboriculturalist, for fear of not getting enough fruits per tree and therefore limiting its production.

Because the blossoming is heterogeneous and the chemical thinning treatment is homogeneous, the arboriculturalist must carry out a manual and very expensive thinning, tree by tree in order to optimize its production.

An object of the present invention is to propose a decision support method and associated decision support system for the management of a farm as a whole, in order to optimize the productivity yield while preserving the resources.

More specifically, an object of the present invention is to propose a method and a system for mapping the intra-plot blossoming rates of fruit trees in an orchard.

BRIEF DESCRIPTION OF THE INVENTION

To this end, the invention proposes a decision support method for the management of an orchard of fruit trees, remarkable in that the method comprises the following steps:
  Receiving a plurality of digital images acquired in color, each image representing a respective fruit element of the orchard and being coded in Red, Green and Blue components,
  Then for each current image of the plurality of images:
  Converting the current digital image acquired, into a converted HSL image coded in Hue Saturation and Lightness components, defined respectively in a Hue plane, a Saturation plane and a Lightness plane,
  Filtering the Hue Saturation and Lightness components:
  in the Hue plane as a function of a predefined Hue threshold value to obtain a filtered Hue plane,
  in the Saturation plane as a function of a predefined Saturation threshold value to obtain a filtered Saturation plane, and
  in the Lightness plane as a function of a predefined Lightness threshold value to obtain a filtered Lightness plane,
  Combining the filtered Hue Saturation and Lightness planes to obtain a Combined plane,
  Calculating a Work plane from the Combined plane, said calculation step comprising a sub-step consisting of:
  filtering the groupings of related pixels of the Combined plane as a function of a size threshold value to remove from the Combined plane the groupings of related pixels the number of pixels of which is less than said size threshold value,
  Counting the objects of interest in the Work plane,
  Determining a blossoming level for each current image as a function of the number of objects of interest counted for said current image.

Preferred but non-limiting aspects of the method according to the invention are as follows:
  the combination step may comprise the sub-steps consisting of:
  determining an Intermediate plane by combining the filtered Hue plane with the filtered Saturation plane or with the filtered Lightness plane,
  averaging the filtered Saturation plane and the filtered Lightness plane to obtain an Averaged plane,
  averaging the Intermediate plane and the Averaged plane to obtain a Resulting plane,
  filtering the Resulting plane by thresholding as a function of a predefined filtering threshold value to obtain the Combined plane;
  the method can also comprise for each current image:
  a step of forming a trunk plane by thresholding the Hue plane, the Saturation plane and the Lightness plane, in order to preserve in the trunk plane the pixels representative of the trunks and/or branches of the fruit element,
  a step of forming a leaf plane by thresholding the Hue plane, the Saturation plane and the Lightness plane, in order to preserve in the trunk plane the pixels representative of the leaves of the fruit element,
  the combination step including the sub-steps consisting of:
  determining an Intermediate plane by combining the filtered Hue plane with the filtered Saturation plane or with the filtered Lightness plane, averaging the filtered Saturation plane and the filtered Lightness plane to obtain an Averaged plane,
averaging the Intermediate plane and the Averaged plane to obtain a Resulting plane,
subtracting from the Resulting plane the trunk and leaf planes to obtain a Subtracted Resulting plane,
filtering the Subtracted Resulting plane by thresholding as a function of a predefined filtering threshold value to obtain the Combined plane;
the sub-step consisting of determining an intermediate plane can consist of:
adding the filtered Hue plane and the filtered Lightness plane to obtain the Intermediate plane, or
making a weighted average of the filtered Hue plane and of the filtered Saturation plane to obtain the Intermediate plane;
the step of calculation on the Combined plane can comprise a sub-step consisting of:
filling the groupings of related pixels having closed cavities to obtain a Filled Combined plane,
filtering the objects of interest of the Filled Combined plane as a function of the circularity of the groupings of related pixels representative of objects of interest;
the step of counting the objects of interest in the Work plane can consist of counting a number of groupings of related pixels representative of at least one object of interest and/or a number of pixels representative of at least one object of interest;
the step of determining a blossoming level for each current image can consist of assigning a blossoming level to said current image as a function of the counted number of objects of interest in said current image, each blossoming level corresponding to a range of numbers of objects of interest;
the method can comprise a step of displaying the blossoming levels associated with the plurality of images on an orchard view, said display step comprising the sub-steps consisting of:
for each current image, detecting the position in the orchard view, of the fruit element represented in the current image from position data associated with said current image, the position data corresponding to the position of an image acquisition device during the acquisition of the current image,
superimposing a colored form on the detected position in the orchard view, the color of the form being representative of a blossoming level of the fruit element;
the method can comprise a step of merging the blossoming levels of the fruit elements per areas along the rows of the orchard;
the merging step can consist of attributing to each considered fruit element in a row of the orchard the blossoming level of the fruit elements neighboring said considered fruit element in its row if at least one neighboring fruit element preceding the considered fruit element and at least one neighboring fruit element following the considered fruit element in its row have the same blossoming level different from the blossoming level of the considered fruit element.

The invention also relates to a decision support system for the management of an orchard of fruit trees, characterized in that it comprises means for implementing the method described above.

The invention also relates to a computer program product comprising programming code instructions intended to execute the steps of the method described above when said program is run on a computer.

BRIEF DESCRIPTION OF THE DRAWINGS

Other advantages and characteristics of the decision support method and system for the management of an orchard of fruit trees will emerge better from the following description of several variants, given by way of non-limiting examples, from the appended drawings wherein.

DETAILED DESCRIPTION OF THE INVENTION

Examples of a management method and system according to the invention will now be described in more detail with reference to the figures. In these various figures, the equivalent elements are designated by the same numerical reference.

Within an orchard of the same variety of apple trees, the blossoming of the trees is heterogeneous. However, the chemical thinning performed is identical for all the trees without taking into account the blossoming rate differences. The method and the system described below make it possible to modulate the thinning of each tree as a function of its associated blossoming level.

1. General Principle

The method according to the invention comprises:
the receipt 10 of acquired images,
a phase of processing the acquired images in order to determine a blossoming level associated with fruit elements constituting the orchard, and possibly
a post-processing phase consisting in generating a map of the blossoming levels of the fruit elements of the orchard.

The processed images are digital images acquired in color. This color is coded in Red, Green and Blue (or RGB) levels. The acquisition of the images consists of photographing the fruit elements constituting the orchard using a device for acquiring a digital image in color. The fruit elements can be the fruit trees of the orchard and/or fruit strips (corresponding to the branches extending between two trunks of successive fruit trees along a row of fruit trees in the orchard).

The acquisition device can be mounted on a mobile vehicle—such as a farm tractor—and comprise for example:
a support,
an optical sensor including a plurality of photosensitive elementary cells (such as a camera) mounted on the support, and
one (or several) lighting member(s) (such as a flash) to illuminate the fruit element of interest during the acquisition of an image, a position detection apparatus—for example based on the GPS system (Global Positioning System)—to detect the position of the optical sensor during the acquisition of each image, a controller programmed to control the sensor, the lighting member and the position detection apparatus.

Such an acquisition device is known to those skilled in the art and will not be described in more detail below.

The acquisition principle is as follows. The acquisition device is displaced along the rows of fruit trees in the orchard. For each fruit tree and/or fruit strip in the orchard, an image is acquired. Thus, each acquired image is associated with a respective fruit element of interest. From the position of the sensor (detected by the position detection apparatus during the acquisition of the image), it is possible to deduce therefrom the position of the fruit element of interest in the orchard.

The processing and possible post-processing phases of the method can be implemented in an integrated or remote decision support system of the acquisition device. In particular, the decision support system comprises a program for carrying out one or more of the steps of the method described below.

The decision support system can be composed of one (or several) workstation(s), and/or one (or several) computer(s) or may be of any other type known to the skilled in the art. The processing system can for example comprise a mobile phone, an electronic tablet (such as an IPAD®), a Personal Digital Assistant (or PDA), etc.

In all cases, the system comprises a processor programmed to allow the processing of the images acquired by the acquisition device.

Figure 1:
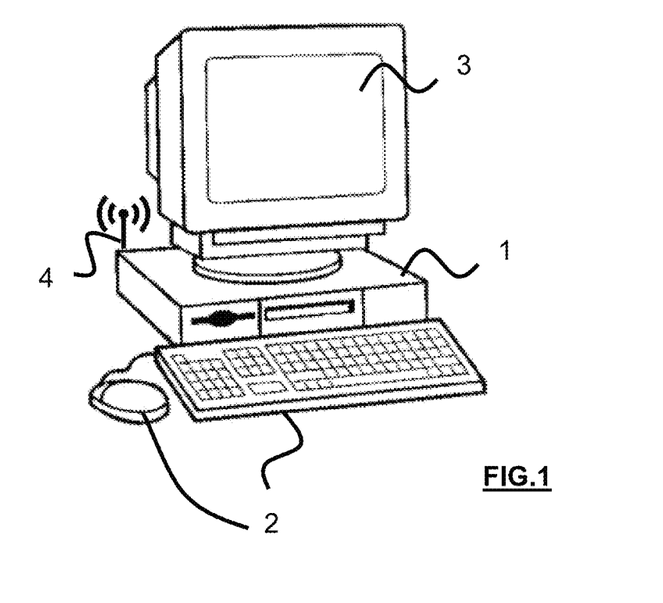
FIG. 1 is a schematic representation of a decision support system for the management of an orchard of fruit trees.

FIG. 1 illustrates an example of a decision support system. It comprises:

processing means 1 such as a processor, input means 2 such as a keyboard and a mouse, display means 3 such as a screen (possibly touch screen), and wired or wireless transmitting/receiving means 4—such as one (or several) connection cable(s) and/or one (or several) antenna(s)—for exchanging data (receipt of the acquired images by the acquisition device, and of the GPS coordinates, etc.) via a communication network—such as the Internet.

The decision support system is used for the implementation of a simple, light and robust image processing method that allows establishing a relative map of the blossoming (flowers and flower buds) of the fruit elements of the orchard, and of which different variants will now be described in more detail.

The method according to the invention will be described with reference to the processing of an image, on the understanding that the steps of the processing phase are repeated for each acquired image.

2. Decision Support Method

Figure 3:
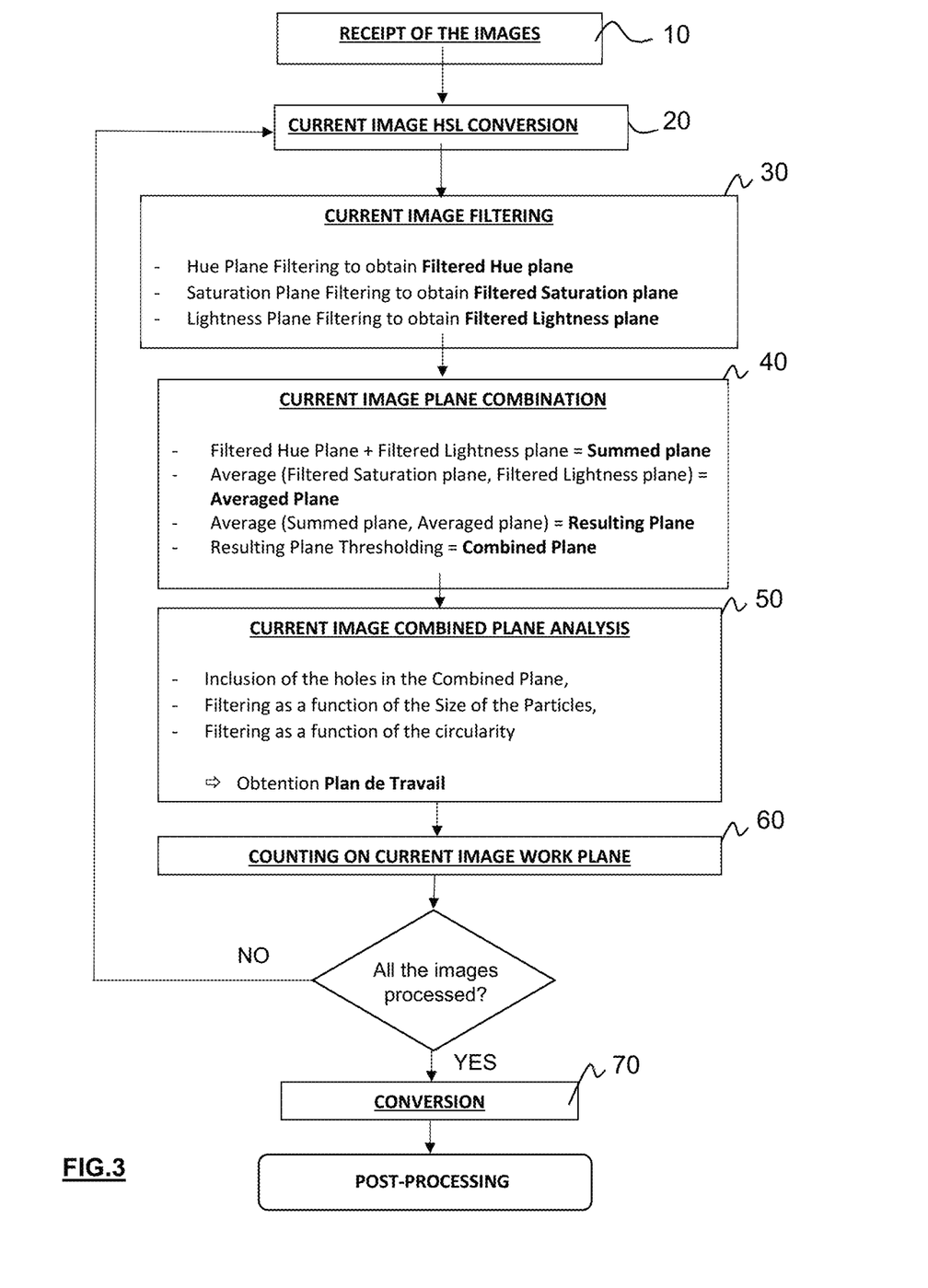
FIG. 3 is a schematic representation of steps of a decision support method for the management of an orchard of fruit trees.
Figure 4:
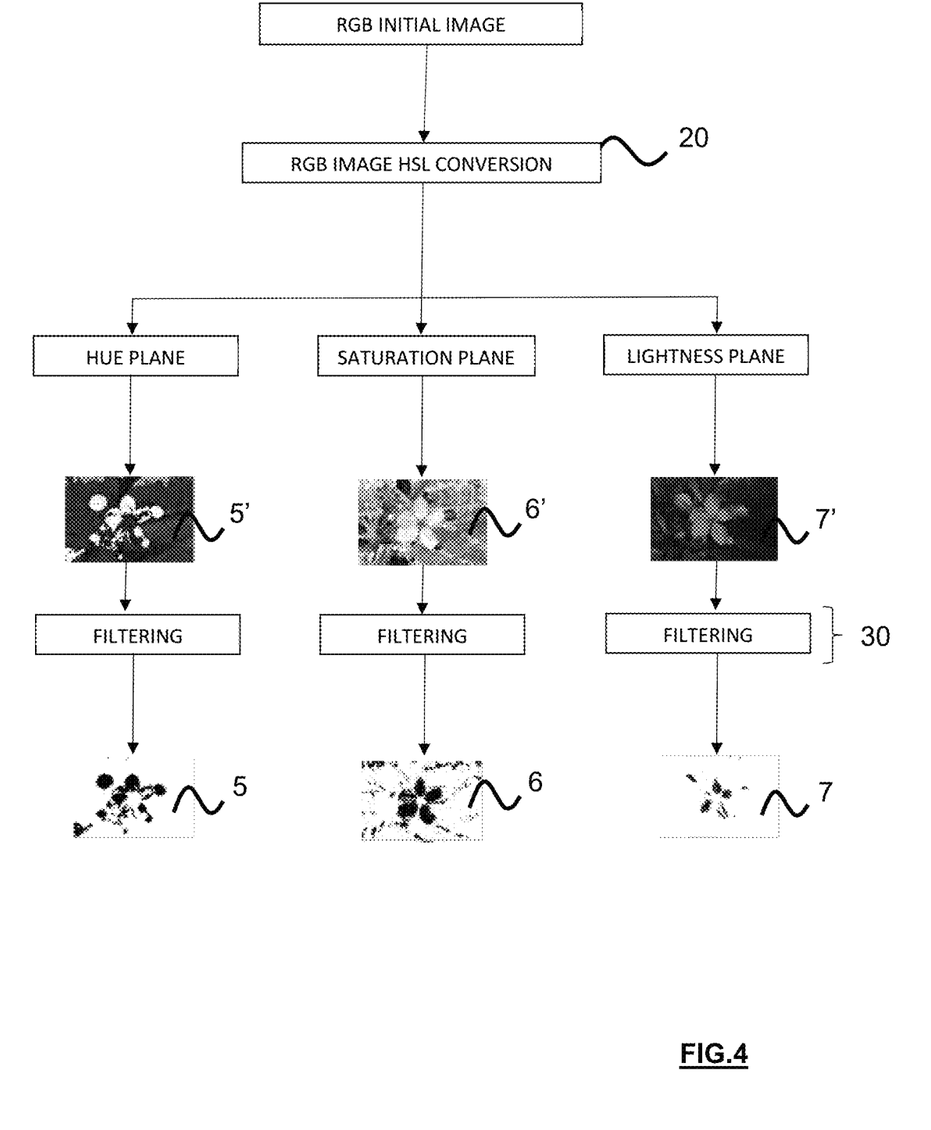
FIGS. 4 to 6 are schematic representations of steps of a processing phase of the decision support method.
Figure 5:
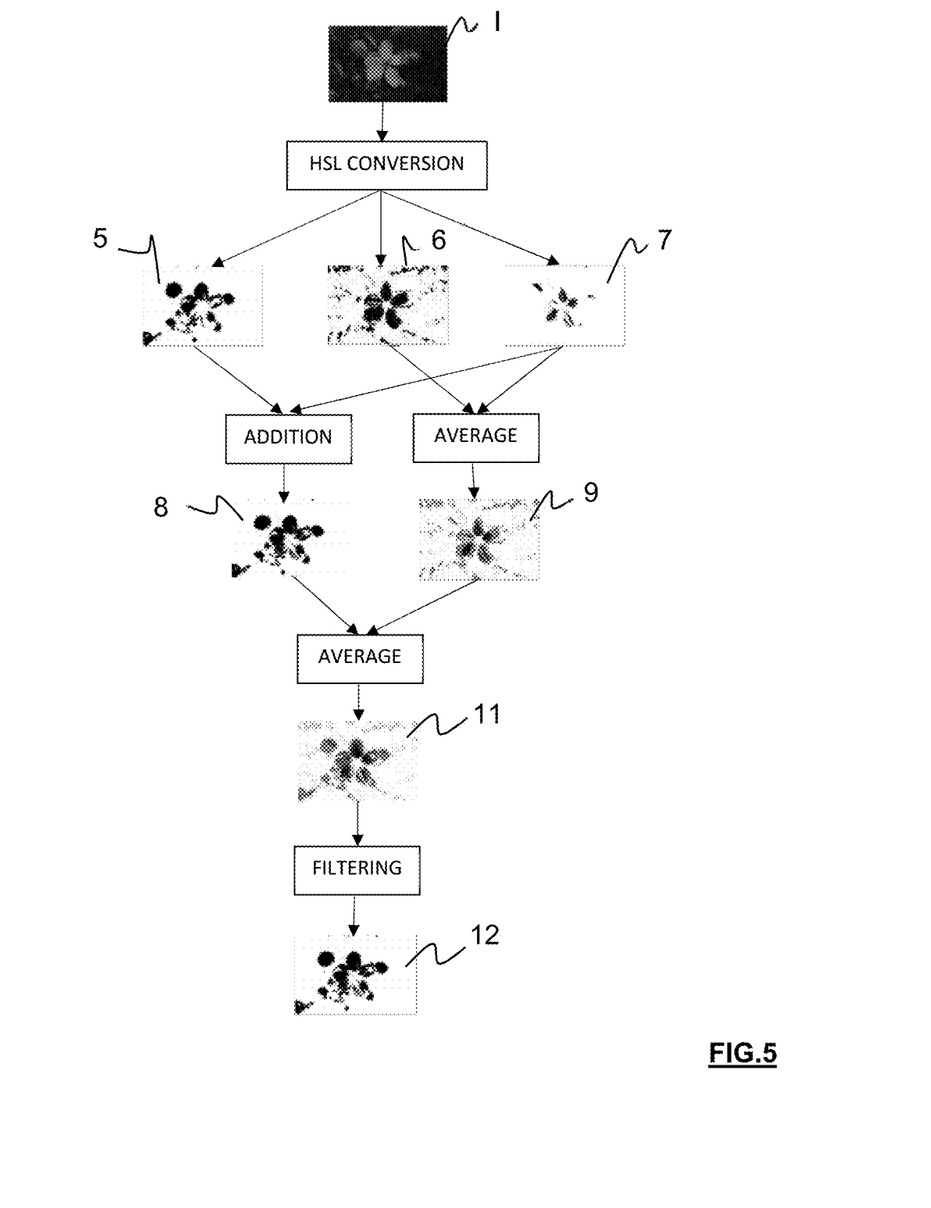
Figure 6:
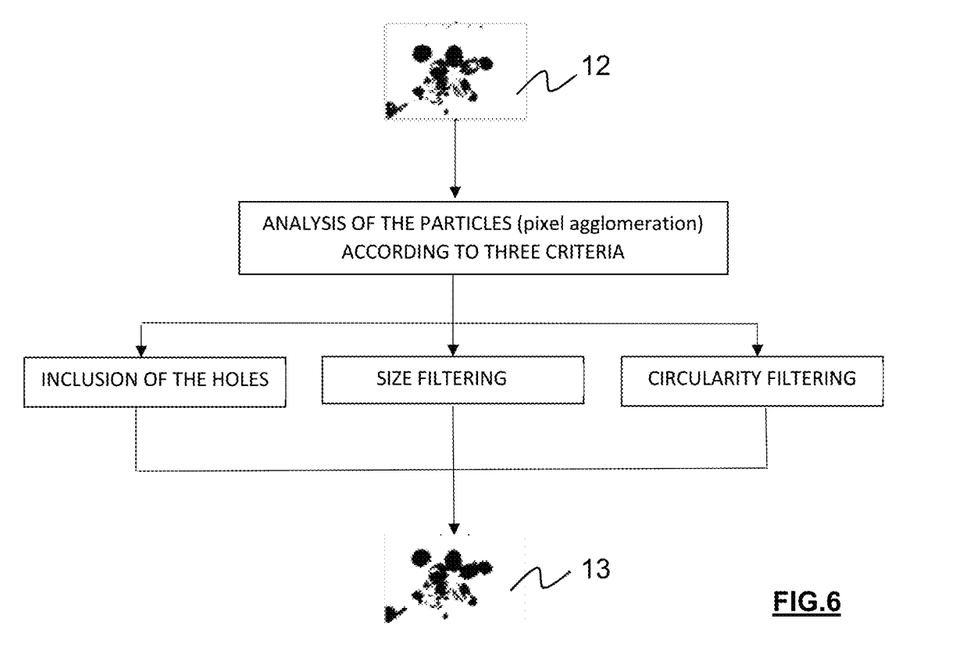

FIG. 3 illustrates the different steps of the processing phase of the method according to the invention.

2.1. HSL Conversion

A first step 20 of the method consists in converting the acquired RGB color digital image I into a converted HSL image. As indicated previously, the acquired digital image I is coded in Red, Green and Blue levels.

The conversion step 20 consists in coding the image into Hue Saturation and Lightness levels.

Figure 2:
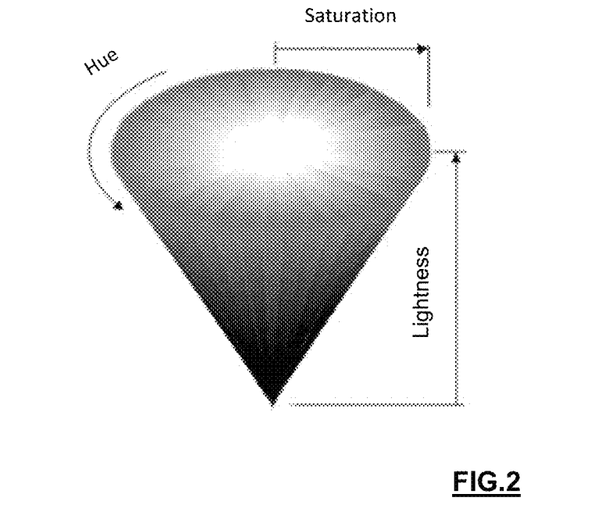
FIG. 2 is a schematic representation of a conversion cone between an image coding in Red Green Blue components and an image coding in Hue Saturation Lightness components.

More precisely and with reference to FIG. 2, each color component of each pixel of the acquired image I in an RGB color space (Red plane, Green plane, Blue plane) is converted into:

a component of Hue (H), a component of Saturation (s), and a component of Lightness (L)

of the pixel in a HSL color space.

Different calculation modes known to those skilled in the art can be used to convert the Red Green Blue components of a pixel into a Hue Saturation Lightness component.

For illustrative purposes only, an example of formulas that allow converting the RGB components of a pixel into HSL components is given below:

From the RGB components of a pixel, the following intermediate variables can be calculated:

$$R'=R/255$$

$$G'=G/255$$

$$B'=B/255$$

$$Cmax=\max(R',G',B')$$

$$Cmin=\min(R',G',B')$$

$$\Delta=Cmax-Cmin$$

the Hue H is then calculated as follows:

$$H = \begin{cases} 0° & \Delta = 0 \\ 60° \times \left(\frac{G'-B'}{\Delta} \bmod 6\right) & , C_{max} = R' \\ 60° \times \left(\frac{B'-R'}{\Delta} + 2\right) & , C_{max} = G' \\ 60° \times \left(\frac{R'-G'}{\Delta} + 4\right) & , C_{max} = B' \end{cases}$$

The Saturation S is calculated as follows:

$$S = \begin{cases} 0 & , \Delta = 0 \\ \frac{\Delta}{1-|2L-1|} & , \Delta <> 0 \end{cases}$$

The Lightness L is calculated as follows:

$$L=(Cmax+Cmin)/2$$

Of course, the present invention is not limited to the application of the above formulas for the conversion of the RGB image into converted HSL image, and other formulas known from the state of the art can be used to carry out this conversion.

Once the conversion step is carried out, the components of each pixel of the converted image can be expressed in three distinct planes (or spaces): a Hue plane 5', a Saturation plane 6' and a Lightness plane 7'. In each plane, the associated component can take a value comprised between 0 and 255.

2.2. Filtering

In a second step 30 of the method, a filtering of the converted HSL image is implemented on each of the Hue Saturation and Lightness components of each pixel.

2.2.1. Filtering of the Hue

More precisely, in the Hue plane 5', a sub-step of thresholding the converted image is implemented. This thresholding allows filtering the color of the object of interest, such as for example the pink of the flower or of the flower bud.

The first Hue threshold value depends on the species and variety of the considered fruit tree.

For example, the pink color of the Granny Smith apple blossoms is more intense than the pink color of the Royal Gala apple blossoms. The first Hue threshold value can be provided by the user or determined from a database depending on the species and variety of the considered fruit tree.

At the end of the thresholding sub-step in the Hue plane 5', a filtered Hue plane 5 is obtained in which only the pixels (or point) whose value is less than the first Hue threshold value are retained. The value of each pixel in the filtered Hue plane 5 is then either 0 or 255.

2.2.2. Filtering of the Saturation

In the Saturation plane 6', a sub-step of thresholding the converted image to remove the non-white pixels is implemented.

The first Saturation threshold value chosen can be 255 to preserve from the Saturation plane only the pixels whose saturation is maximum or close to 255 (for example 245, 235, . . . , 192).

At the end of the thresholding sub-step in the Saturation plane 6', a filtered Saturation plane 6 is obtained in which only the pixels whose value is greater than the first Saturation threshold value are retained. The value of each pixel in the filtered Saturation plane 6 is then either 0 or 255.

2.2.3. Filtering of the Lightness

In the Lightness plane 7', a sub-step of thresholding the converted image to remove the non-luminous pixels is implemented.

The first Lightness threshold value chosen depends on:
- the average of Lightness of the pixels of the converted image,
- the standard deviation of Lightness of the pixels of the converted image, and
- the characteristics of the acquisition device (and in particular characteristics of the photosensitive sensor used in the acquisition device),
- the shooting conditions.

For each processed image, the thresholding sub-step in the Lightness plane comprises:
- the calculation of the average of Lightness of the pixels in the Lightness plane ("average" in the formula below),
- the calculation of the standard deviation of Lightness of the pixels in the Lightness plane ("StandardDeviation" in the formula below).

From the average and standard deviation thus calculated and by taking into account the technical parameters of the acquisition device and shooting conditions, a first Lightness threshold value is determined according to the following formula:

Lightness threshold value=Average+$Coeff_{AP}$×DeviationType.

Where: $Coeff_{AP}$ is a coefficient defined as a function of the characteristics of the acquisition device and of the shooting conditions.

Thanks to the experiments conducted for several years, the inventors established a correspondence table between the characteristics of the acquisition device, the shooting conditions and the $Coeff_{AP}$.

| shooting conditions | characteristics of the acquisition device | Coefficients for a given acquisition device |
|---|---|---|
| Facing the sun | Sensor size Shutter speed | $Coeff_1$ |
| Away from the sun | Focal opening ISO | $Coeff_2$ |
| | | Condition $Coeff_2 > Coeff_1$ |

The first Lightness threshold value thus calculated is used in the thresholding sub-step of the converted image in the Lightness plane.

At the end of the thresholding sub-step in the Lightness plane 7', a filtered Lightness plane 7 is obtained in which only the pixels whose value is greater than the first Lightness threshold value are retained. The value of each pixel in the filtered Lightness plane 7 is then either 0 or 255.

2.3. Combinations on the Filtered Planes

The filtering step allows obtaining a filtered Hue plane 5, a filtered Saturation plane 6 and a filtered Lightness plane 7.

In another step 40 of the method, the filtered planes are combined so as to reveal, on a final processed image (called "work plan"), only the objects of interest (i.e. flowers and flower buds of the fruit element of interest).

The objective of these combinations of planes is to eliminate the noises present in the initial image (flowers of the second plane present on fruit elements located behind the fruit element of interest, etc.).

The combination step may comprise a sub-step consisting of adding the filtered Hue plane 5 and the filtered Lightness plane 7. This allows obtaining an intermediate plane 8 in which the majority of the buds and flowers of the initial image are reconstituted, in particular when the images were acquired away from the sun. As a variant, the combination step may comprise a sub-step consisting of making a weighted average of the filtered Hue plane 5 and of the filtered Saturation plane 6 according to the following formula:

Intermediate Plane=((2×filtered Hue Plane)+filtered Saturation Plane)/3.

This also allows obtaining an Intermediate plane 8 in which the majority of the buds and flowers of the initial image are reconstituted, in particular when the images have been acquired while facing the sun. The value of each pixel in the Intermediate plane 8 is then either 0 or 255.

The combination step can also comprise a sub-step consisting in averaging the filtered Saturation plane 6 and the filtered Lightness plane 7. More precisely, the value of each pixel of the filtered Saturation plane 6 is summed to the value of the pixel corresponding in the filtered Lightness plane 7, and the result of this sum is divided by two to obtain an Averaged plane 9 according to the following formula:

Averaged Plane=(Filtered Saturation Plane+filtered Lightness Plane)/2.

The value of each pixel in the Averaged plane 9 is then either 0 or 128 or 255. This averaging sub-step allows accentuating the white portions of the object of interest (flower or bud flower) while at the same time reducing the noises of the second plane.

The method can also comprise an additional sub-step consisting of averaging the Intermediate plane 8 and the Averaged plane 9 to obtain a Resulting plane 11 according to the following formula:

Resulting Plane=(Intermediate Plane+Averaged Plane)/2.

Each pixel of the Resulting plane 11 can be associated with one of the following values: 0, 64, 128, 191 or 255. This optional step allows accentuating the reduction of the noises of the second plane.

Finally, a sub-step of filtering the Resulting plane 11 by thresholding can be implemented to obtain a Combined plane 12. The first filtering threshold value chosen can be 123 so as not to preserve the Resulting plane 11 (or the Intermediate plane 8) than the pixels whose value is representative of an object of interest. The value of each pixel in the Combined plane 12 is then either 0 or 255.

Advantageously, the method can also comprise:
a step of forming a Trunk plane by thresholding the Hue plane, the saturation plane and the Lightness plane, in order to preserve in the Trunk plane the pixels representative of the trunks and/or branches of the fruit element, the step of forming a trunk plane including the following combination sub-steps:
filtering the Hue Saturation and Lightness components of the converted HSL image in the Hue Saturation and Lightness planes according to second Hue Saturation and Lightness threshold values to obtain: a filtered Trunk Hue plane, a filtered Trunk Saturation plane and a filtered Trunk Lightness plane,
combining the filtered Trunk Hue, filtered Trunk Saturation and filtered Trunk Lightness planes to obtain the Trunk map;
a step of forming a leaf plane by thresholding the Hue plane, the Saturation plane and the Lightness plane, in order to preserve in the leaf plane the pixels representative of the leaves of the fruit element, the step of forming a Leave plane including the following combination sub-steps:
filtering the Hue Saturation and Lightness components of the converted HSL image in the Hue Saturation and Lightness planes according to third Hue Saturation and Lightness threshold values to obtain: a filtered Leaf Hue plane, a filtered Leaf Saturation plane and a filtered Leaf Lightness plane,
combining the filtered Leaf Hue, filtered Leaf Saturation and filtered Leaf Lightness planes to obtain the Leaf plane.

In this case, the combination step includes the following sub-steps:
adding the filtered Hue plane 5 and the filtered Lightness plane 7 to obtain an Intermediate plane 8,
averaging the filtered Saturation plane 6 and the filtered Lightness plane 7 to obtain an Averaged plane 9,
averaging the Intermediate plane 8 and the Averaged plane 9 to obtain a Resulting plane 11,
subtracting the trunk and leaf planes from the Resulting plane 11 to obtain a Subtracted Resulting plane, and
filtering the Subtracted Resulting plane by thresholding as a function of a predefined filtering threshold value to obtain the Combined plane 12.

2.4. Calculations on the Combined Plane

The combination step 40 on the filtered Hue Saturation and Lightness planes 5, 6, 7 allows obtaining a Combined plane 12 in which the noises have been mainly eliminated, in particular the noises in the second plane.

Calculations (related filling and filtering) are then carried out on this Combined plane 12 to remove the last noises present in the initial image I so as to keep only the objects representative of a blossoming level of the fruit element of interest.

The calculation step 50 on the Combined plane 12 can comprise the following sub-steps (taken independently or in combination):
a related filling sub-step,
a filtering sub-step as a function of the size of the groupings of related pixels representative of an object of interest or of a portion of this object of interest, and
a filtering sub-step as a function of the circularity of the groupings of related pixels.

2.4.1. Filling

The filling sub-step consists of filling the groupings of related pixels representative of objects of interest and having closed cavities (similar to holes) to obtain a Filled Combined plane.

This step can be implemented by using morpho-mathematical image processing functions (such as a morphological dilation followed by morphological erosion) or any other image processing technique known to those skilled in the art (region growth algorithm, etc.).

The filling sub-step allows reconstituting the particles (petal, etc.) forming the objects of interest in the Combined plane 12.

2.4.2. Filtering of the Size

The size filtering sub-step consists of removing from the Combined plane 12 (or from the Filled Combined plane) the groupings of related pixels the number of pixels of which is less than a size threshold value (for example removing from the Combined plane 12 the groupings of five related pixels or less).

This size filtering sub-step allows obtaining a Filtered Size Combined plane (or a Filled & Filtered Size Combined plane) in which the last noises in the second plane have been eliminated.

2.4.3. Filtering of the Circularity

The filtering sub-step as a function of the circularity of the groupings of related pixels present in the Combined plane 12 (or in the Filled Combined plane, or in the Filled & Filtered Size Combined plane) allows removing from said plane the non-circular objects (false positives) constituting noises present in the first plane, such as moss covering a branch of the fruit element or a support cable of the fruit element, etc.

This filtering of the circularity is implemented by using image processing functions known to those skilled in the art and which will not be described in more detail below.

2.5. Counting

At the end of the step of analyzing the Combined plane 12, a Work plane 13 is obtained. This Work Plane 13 constitutes a final processed image from which the blossoming level of the fruit element of interest is estimated.

A step 60 of counting the objects of interest (flower or flower bud) present in the Work plane 13 is implemented.

The counting of the objects of interest can be carried out:
either by counting the number of pixels representative of the objects of interest,
or by counting the number of groupings (i.e. of clusters) of related pixels representative of objects of interest.

Counting a number of clusters of pixels rather than the number of pixels allows making the method independent of the stage of blossoming of the fruit element. Indeed, by counting only the number of pixels representative of objects of interest, a fruit element that does not include flowers can be considered as slightly flowered even if it comprises a large number of flower buds.

As a variant, the counting step may consist of combining a counting of the number of pixels representative of the objects of interest, and a counting of the number of groupings (i.e. of clusters) of relayed pixels representative of objects of interest. For example, the counting can comprise the following sub-steps:
- counting the number of pixels representative of the objects of interest,
- dividing the number of pixels counted by a predefined coefficient (equal to the minimum number of pixels forming an elementary particle) to estimate a number of particles,
- counting the number of groupings of related pixels representative of objects of interest,
- calculating the average between the estimated number of particles and the number of counted groupings of related pixels.

The counting step 60 (implemented by using any processing algorithm known to those skilled in the art) allows calculating a number of objects of interest detected for the processed current image (either a number of pixels constituting the objects of interest, or a number of clusters of pixels constituting the objects of interest, or a combination of the two).

Knowing the position of the acquisition device during the acquisition of each image thanks to the position detection apparatus (which allows associating the GPS coordinates of the acquisition device with each acquired image), it is possible to accurately determine the position, in the orchard, of the fruit element for which the number of objects of interest has been calculated.

The different previous steps are repeated for each acquired image. A number of objects of interest calculated for each acquired image, and therefore for each fruit element in the orchard is thus obtained.

2.6. Conversion into Blossoming Level

The method also comprises a step 70 consisting of classifying the different processed images into categories (hereinafter called "blossoming level") as a function of the number of objects of interest calculated for each image.

Each blossoming level corresponds to a range of calculated numbers of objects of interest. For example:
- the first blossoming level (representative of the least blossomed fruit elements) corresponds to a calculated number of objects of interest comprised between 0 and 10,
- the second blossoming level corresponds to a calculated number of objects of interest comprised between 11 and 20,
- the third blossoming level corresponds to a calculated number of objects of interest comprised between 21 and 30, etc.

Preferably, the number of blossoming levels is equal to five. This allows obtaining thinning treatment maps that are accurate and appropriate for the intra-plot heterogeneity.

Of course, the user can choose to vary this number of blossoming levels by increasing or decreasing it according to his needs.

Advantageously for each blossoming level, a sample image corresponding to an initial acquired image whose calculated number of objects of interest satisfies said blossoming level can be displayed to the user. This allows the user to assess more precisely to which aspect of the fruit element of his orchard each blossoming level corresponds.

To determine the thresholds of each blossoming level, two distinct methods can be used. Of course, the user has the possibility of modifying these thresholds according to his needs.

2.6.1. First Method for Determining the Blossoming Levels

A first method can consist of determining the thresholds of the blossoming levels as a function of the number of objects of interest calculated $T_{max}$ for the most blossomed fruit element by applying the following formula:

Threshold $n = T_{max} * (1-(n/15))$, with $1 \leq n \leq 4$.

2.6.2. Second Method for Determining Blossoming Levels

A second method can consist of determining the thresholds of the blossoming levels as a function of a trend curve of the histogram of the numbers of objects of interest calculated for all the fruit elements of the orchard.

More precisely, the thresholds of the blossoming levels are defined as the minimums of the trend curve of the histogram of the calculated numbers of objects of interest for all the fruit elements of the orchard.

3. Post-Processing

Following the step of classifying the calculated numbers of objects of interest per blossoming level, the results of the processing (i.e. position of the fruit element and associated blossoming level) can be sent to a modulation console of a thinning device of the user, the modulation console making it possible to adjust the amount of thinning chemical product to be sprayed on each fruit element.

Figure 7:
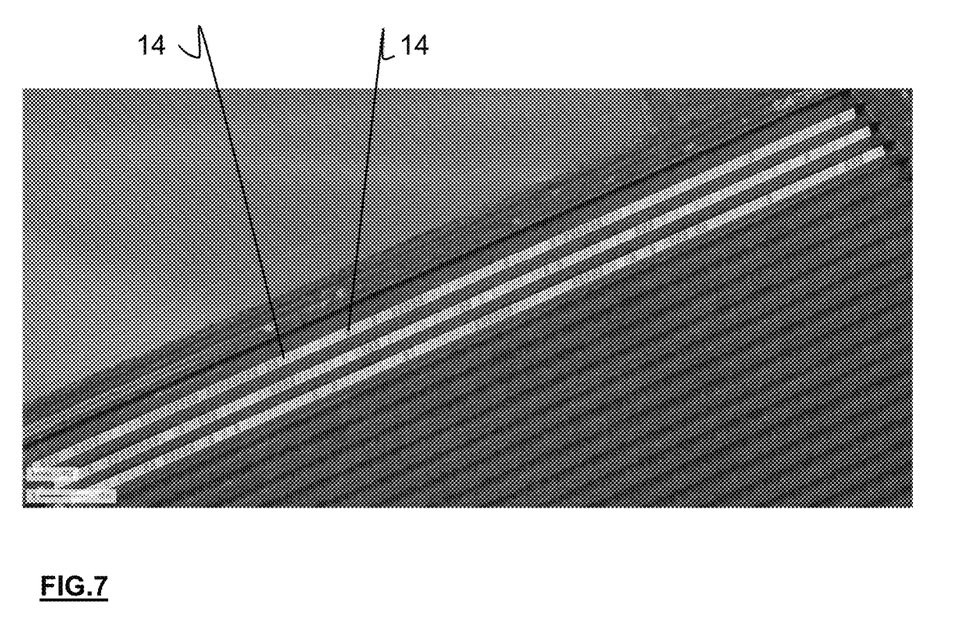
FIG. 7 is an example of a shot of an orchard in which blossoming levels have been represented for three rows of the orchard.

As a variant or in combination, these processing results can be displayed by means of a color code 14 on an aerial view of the orchard, as illustrated in FIG. 7.

When the user's thinning device does not have a modulation console allowing him to regulate the amount of thinning chemical product to be applied fruit element by fruit element, post-processing steps described below can be implemented to merge (i.e. bring together) the blossoming levels of each fruit element per areas.

Figure 8:
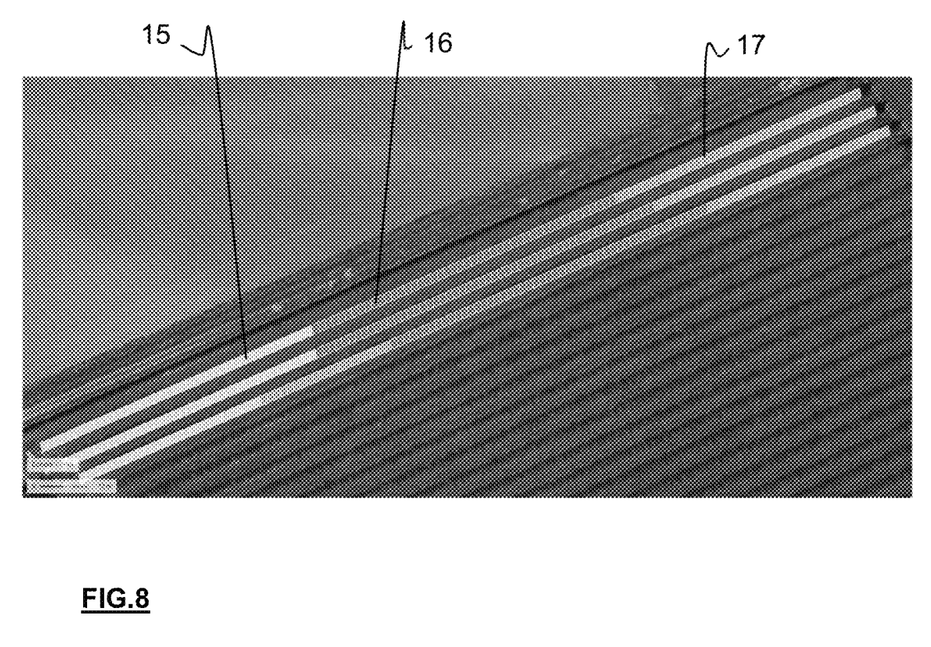
FIG. 8 is an example of a shot of an orchard in which the blossoming levels illustrated in FIG. 7 have been merged per area.

The merging of the blossoming levels per areas 15, 16, 17 takes into account the organization of the fruit elements in the orchard. In particular, the fruit elements being organized by rows, the merging by areas 15, 16, 17 is done by row, in one or more passes.

One of the merging conditions can consist in considering a neighborhood of fruit elements along the row of interest. For each fruit element of interest of a considered row, its associated blossoming level is for example made equal to the blossoming level of the neighboring fruit elements of the fruit element of interest in the considered row if two neighboring fruit elements precede the fruit element of interest and two neighboring fruit elements following the fruit element of interest have the same blossoming level different from the blossoming level of the fruit element of interest.

This step of merging the blossoming levels of each fruit element per areas 15, 16, 17 allows obtaining homogeneous areas of blossoming levels of fruit elements along the rows of the orchard in order to facilitate the implementation of the chemical thinning treatment by the user.

The results of this post-processing step can be displayed using a color code on an aerial image of the orchard, as illustrated in FIG. 8.

4. Conclusions

The management method and system described above allow the production of a relative blossoming map of the entire orchard in order to carry out a modular thinning in order to optimize the production (quality, size of the fruits and overall production volume).

The method and system described above also allow:
reducing the chemical inputs of the thinning by optimizing their use (the right dose in the right location),
regulating the alternation of the orchard from one year to the next,
optimizing other technical interventions in the orchard, related to the blossoming intensity such as the fertilizer supply or the orchard harvesting or pruning operations.

The reader will have understood that many modifications can be made to the invention described above without physically departing from the new teachings and advantages described here.

In particular, the reader will appreciate that the processing and post-processing phases are independent. More specifically, the post-processing steps described in pixel 3 can be implemented based on the blossoming levels determined with other methods than the processing phase described in pixel 2.

Also, the reader will appreciate that the digital image(s) acquired in color, and coded in Red, Green and Blue components can be converted into one (or several) converted HSB image(s) coded in Hue Saturation and Brightness components. In this case, the different filtering, combination and calculation operations of a work plane are carried out from the Hue Saturation and Brightness components rather than from the Hue Saturation and Lightness components.

Consequently, all modifications of this type are intended to be incorporated within the scope of the appended claims.

The invention claimed is:

1. A decision support method for the management of a fruit tree orchard, said decision support method comprising the following phases:
   Receiving a plurality of digital colour images from one of an optical sensor and a camera,
   wherein the digital images are acquired along the rows of the fruit tree orchard, and
   wherein each image represents a respective fruit element of the fruit tree orchard,
   Processing the plurality of acquired images for obtaining a plurality of processed images, said processing phase comprising, for each current image of the plurality of images, the following steps:
   Detecting objects of interest in each current image,
   Counting the number of objects of interest detected in each current image, and
   Determining a blooming level for each current image, wherein the blooming level is determined as a function of the number of objects of interest counted for said current image; and
   Post-processing the plurality of processed images, said post-processing phase comprising the following steps:
   Merging the blooming levels of the fruit elements by areas along the rows of the fruit tree orchard, and
   Generating a map of the blooming levels of the fruit elements of the fruit tree orchard;
   wherein the merging step comprises assigning to each fruit element considered in a row of the fruit tree orchard the blooming level of the fruit elements adjacent to said fruit element considered in its row if at least one adjacent fruit element preceding the considered fruit element and at least one adjacent fruit element following the fruit element considered in its row have the same blooming level different from the blooming level of the considered fruit element.

2. The decision support method according to claim 1, wherein the step of counting the number of detected objects of interest consists in counting a number of groupings of related pixels representative of at least one object of interest or a number of pixels representative of at least one object of interest.

3. The decision support method according to claim 1, wherein the step of determining a blooming level for each current image comprises assigning a blooming level to said current image as a function of the number of objects of interest counted in said current image, each blooming level corresponding to a range of numbers of objects of interest.

4. The decision support method according to claim 1, which further comprises a step of displaying the blooming levels associated with the plurality of images on a view of the fruit tree orchard, said displaying step comprising the sub-steps of:
   for each current image, detecting the position, in the view of the fruit tree orchard, of the fruit element represented in the current image from position data associated with said current image, the position data corresponding to the position of an image acquisition device during the acquisition of the current image, and
   superimposing a coloured shape on the position detected in the view of the fruit tree orchard, the colour of the coloured shape being representative of a blooming level of the fruit element.

5. The decision support method according to claim 4, wherein the displaying step further comprises a sub-step consisting in displaying, for each blooming level, a sample image corresponding to an initial acquired image for which the calculated number of objects of interest satisfies said blooming level.

6. The decision support method according to claim 1, wherein the step of determining a blooming level comprises a sub-step consisting in determining thresholds of each blooming level as a function of the calculated number of objects of interest $T_{max}$ for the fruit element the most in bloom by applying the following formula:

$$\text{Threshold } n = T_{max} * (1 - (n/15)), \text{ with } 1 \leq n \leq 4.$$

7. The decision support method according to claim 1, wherein the step of determining a blooming level comprises a sub-step consisting in determining thresholds of each blooming level according to a trend curve of a histogram of the calculated numbers of objects of interest for the set of fruit elements of the fruit tree orchard.

8. The decision support method according to claim 1, wherein the post-processing phase further comprises a step consisting in sending the generated blooming levels map to a modulation console of a thinning device, the modulation console allowing adjustment of the thinning chemical quantity to be sprayed on each fruit element as a function of the blooming level assigned to each fruit element.

9. A decision support system for the management of a fruit tree orchard, said decision support system comprising means for implementing a decision support method for the management of a fruit tree orchard, wherein the decision support method comprises the following phases:
   Receiving a plurality of digital colour images from one of an optical sensor and a camera, wherein the digital images are acquired along the rows of the fruit tree orchard, wherein each image represents a respective fruit element of the fruit tree orchard;
   Processing the plurality of acquired images for obtaining a plurality of processed images, said processing phase comprising, for each current image of the plurality of images, the following steps:
   Detecting objects of interest in each current image, Counting the number of objects of interest detected in each current image, and Determining a blooming level for each current image, wherein the blooming level is determined as a function of the number of objects of interest counted for said current image; and Post-processing the plurality of processed images, said post-processing phase comprising the following steps:

Merging the blooming levels of the fruit elements by areas along the rows of the fruit tree orchard, and Generating a map of the blooming levels of the fruit elements of the fruit tree orchard;

wherein the merging step comprises assigning to each fruit element considered in a row of the fruit tree orchard the blooming level of the fruit elements adjacent to said fruit element considered in its row if at least one adjacent fruit element preceding the considered fruit element and at least one adjacent fruit element following the fruit element considered in its row have the same blooming level different from the blooming level of the considered fruit element.

10. A non-transitory computer program product comprising programming code instructions intended to execute the steps of a decision support method for the management of a fruit tree orchard when said non-transitory computer program is run on a computer, the decision support method comprising the following phases:

Receiving a plurality of digital colour images from one of an optical sensor and a camera, wherein the digital images are acquired along the rows of the fruit tree orchard, wherein each image represents a respective fruit element of the fruit tree orchard;

Processing the plurality of acquired images for obtaining a plurality of processed images, said processing phase comprising, for each current image of the plurality of images, the following steps:

Detecting objects of interest in each current image,

Counting the number of objects of interest detected in each current image, and

Determining a blooming level for each current image, wherein the blooming level is determined as a function of the number of objects of interest counted for said current image; and Post-processing the plurality of processed images, said post-processing phase comprising the following steps:

Merging the blooming levels of the fruit elements by areas along the rows of the fruit tree orchard, and Generating a map of the blooming levels of the fruit elements of the fruit tree orchard;

wherein the merging step comprises assigning to each fruit element considered in a row of the fruit tree orchard the blooming level of the fruit elements adjacent to said fruit element considered in its row if at least one adjacent fruit element preceding the considered fruit element and at least one adjacent fruit element following the fruit element considered in its row have the same blooming level different from the blooming level of the considered fruit element.

* * * * *